(12) United States Patent
Kim

(10) Patent No.: US 6,567,142 B1
(45) Date of Patent: May 20, 2003

(54) REFLECTIVE LIQUID CRYSTAL DISPLAY DEVICE INCLUDING A RETARDATION FILM OF TWO UNIAXIAL FILMS

(75) Inventor: Woo Hyun Kim, Seoul (KR)

(73) Assignee: LG Philips LCD, Co., Ltd., Seoul (KR)

( * ) Notice: Subject to any disclaimer, the term of this patent is extended or adjusted under 35 U.S.C. 154(b) by 0 days.

(21) Appl. No.: 09/522,918

(22) Filed: Mar. 10, 2000

(30) Foreign Application Priority Data

Mar. 12, 1999 (KR) .............................. 99-8411

(51) Int. Cl.[7] .......................................... G02F 1/1335
(52) U.S. Cl. ....................................................... 349/119
(58) Field of Search .............................. 349/117, 118, 349/119, 120, 121

(56) References Cited

U.S. PATENT DOCUMENTS

| | | | |
|---|---|---|---|
| 5,721,600 A | * | 2/1998 | Sumiyoshi et al. ......... 349/119 |
| 5,737,047 A | * | 4/1998 | Sakamoto et al. .......... 349/119 |
| 5,798,809 A | * | 8/1998 | Nakamura et al. .......... 349/119 |
| 5,847,789 A | * | 12/1998 | Nakamura et al. ............ 349/99 |
| 5,995,180 A | * | 11/1999 | Moriwaki et al. ............. 349/96 |
| 6,144,432 A | * | 11/2000 | Hatanaka et al. ........... 349/119 |
| 6,362,862 B1 | * | 3/2002 | Itoh et al. ................... 349/119 |

* cited by examiner

Primary Examiner—Kenneth Parker
(74) Attorney, Agent, or Firm—Birch, Stewart, Kolasch & Birch, LLP (57) ABSTRACT

A reflective liquid crystal display device includes: first and second substrates spaced apart and facing each other; a twisted nematic liquid crystal layer sandwiched between the two substrates; first and second orientation films on first and second sides of the liquid crystal layer, respectively; a retardation film disposed on the first substrate and opposite to the liquid crystal layer, the film having first and second layers; a polarizer disposed on the retardation film; and a reflector disposed between the liquid crystal layer and the second substrate to reflect light passed through the liquid crystal layer.

19 Claims, 7 Drawing Sheets

REFLECTIVE LIQUID CRYSTAL DISPLAY DEVICE INCLUDING A RETARDATION FILM OF TWO UNIAXIAL FILMS

BACKGROUND OF THE INVENTION

1. Field of the Invention

This invention relates to a reflective liquid display device that ensures a high reflectance and contrast ratio in a range of wide viewing angles.

2. Description of Conventional Art

In general, a reflective liquid crystal display device includes a lower substrate, a reflector, a lower orientation film, a liquid crystal layer, an upper orientation film, an upper transparent electrode, an upper substrate, an optical film and a polarizer. In such general structure, the upper and lower glass substrates are disposed facing each other, and the liquid crystal material is located between them. Phases of the liquid crystals may include nematic and cholesteric. In a nematic phase material, the orientation of liquid crystals can include homogeneous, homeotropic, hybrid and twisted.

A twisted liquid crystal is one in which liquid crystal molecules are aligned substantially parallel to the surface of the substrates but the direction of orientation is twisted in an angle between the substrates. A reflective liquid crystal display device having a twisted nematic liquid crystal mode ("TN"mode) generally operates according to the following principles.

When no voltage is applied across the liquid crystal material, light passing through the upper substrate is linearly polarized through a polarizer, and then is circularly polarized through a retardation film. The circularly polarized light then passes through the liquid crystal layer and is converted to linearly polarized light. This linearly polarized light is then reflected from a reflector. The reflected light again passes through the liquid crystal layer and is converted to circularly polarized light, which then passes through the retardation film, and is converted to a linearly polarized light parallel to the polarization axis of polarizer. Such light passes through the polarizer and out of the display device.

In contrast, when a sufficient voltage is applied across the liquid crystal material, circularly polarized light, after passing the polarizer and retardation film, passes through the liquid crystal layer with no change. The light then reflects from the reflector, remaining circularly polarized light. Then, it passes the liquid crystal and retardation film to, becoming a linearly polarized light perpendicular to the axis of polarizer. Such light is absorbed by the polarizer, and does not exit the display device.

Display images greatly depend on optimization of the parameters of each cell component. The important parameters for efficient transmission of light through a reflective liquid crystal display device are the transmission axis angle of polarizer, the optical structure of the retardation film, the thickness (d) and birefringence property (Δn) of the liquid crystal layer, and the orientation direction of the orientation film.

Figure 1:
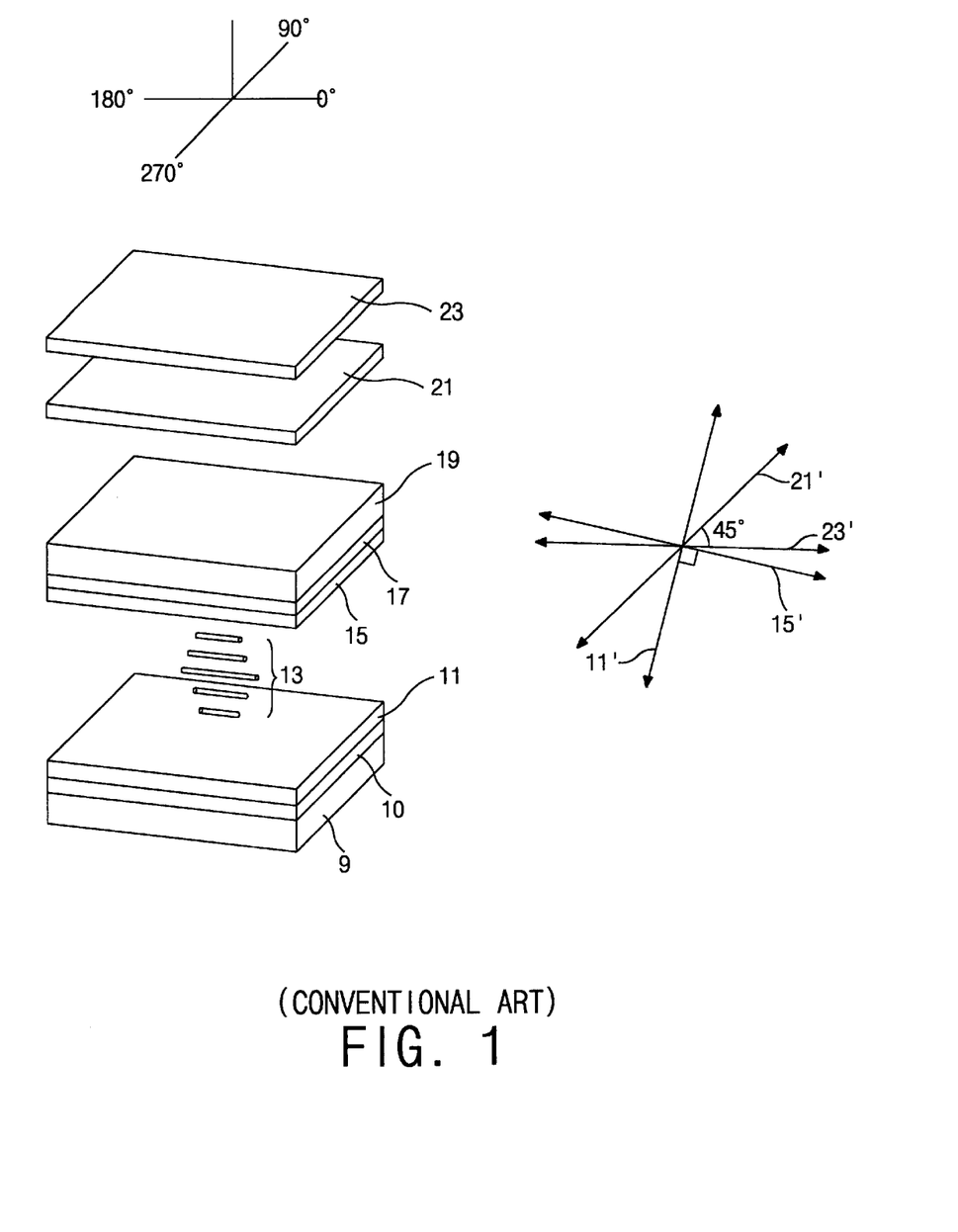
FIG. 1 is a perspective view illustrating the cell configuration of a conventional reflective liquid crystal display device having one uniaxial λ/4 film.

FIG. 1 is a schematic diagram illustrating a cell configuration of a conventional reflective liquid crystal display device, where a 90° twisted liquid crystal mode is adopted. The device includes a lower substrate 9, a reflector 10, a lower orientation film 11, a liquid crystal layer 13, an upper orientation film 15, a transparent electrode 17, an upper substrate 19, a λ/4 film 21 and a polarizer 23.

The λ/4 film 21 is a uniaxial film having a retardation of λ/4 for optical compensation. In the cell configuration of FIG. 1, the orientation direction 15' of upper orientation film 15 makes a 90° angle with the orientation direction 11' of the lower orientation film 11. The transmission axis 23' of polarizer 23 makes a 20° angle with the orientation direction 15' of upper orientation film 15 and a 45° angle with the optical axis 21' of the uniaxial λ/4 film 21. The λ/4 film 21 is composed of one uniaxial film.

However, when using one uniaxial λ/4 film, it cannot consistently produce a λ/4 retardation over a broad wavelength band of visible light, and thus the display characteristics of the liquid crystal display device are not good.

SUMMARY OF THE INVENTION

An object of this invention is to provide a reflective liquid crystal display device with a high reflectance and contrast ratio and a wide viewing angle, while optimizing the parameters of the cell components.

In order to achieve the object, this invention provides, in one embodiment, a reflective liquid crystal display device including a reflector to reflect light impinging thereon; a first orientation film on the reflector, the first orientation film having a first orientation angle; a twisted nematic liquid crystal layer on the first orientation film; a second orientation film on the liquid crystal layer; a first uniaxial film on the second orientation film, the first uniaxial film having a first optical axis angle; a second uniaxial film on the first uniaxial film, the second uniaxial film having a second optical axis angle, and wherein the first and second uniaxial films together operate to change a polarization of incident light between circular and linear polarization; and a polarizer on the second uniaxial film to pass light of a given linear polarization.

BRIEF DESCRIPTION OF THE DRAWINGS

For a more complete understanding of the invention and its advantages, reference is now made to the following descriptions taken in conjunction with the accompanying drawings, in which.

DETAILED DESCRIPTION OF PREFERRED EMBODIMENTS

Simulations are performed to find an optimum cell configuration by varying and combining the parameters of the cell components to obtain a reflective liquid crystal display device according to the invention.

Figure 2:
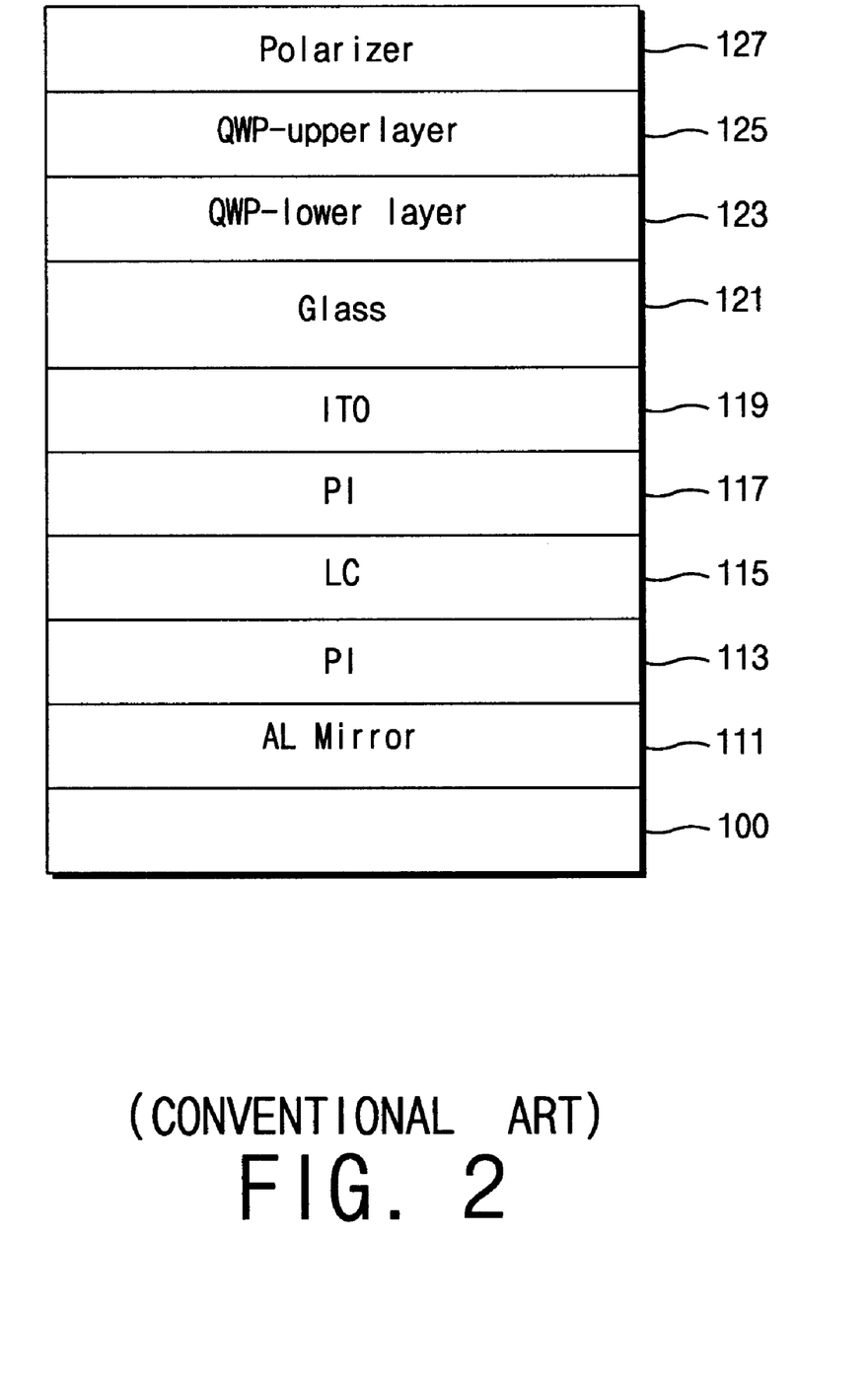
FIG. 2 is a side view illustrating the cell configuration of a liquid crystal display device having two uniaxial films according to the invention.
Figure 3:
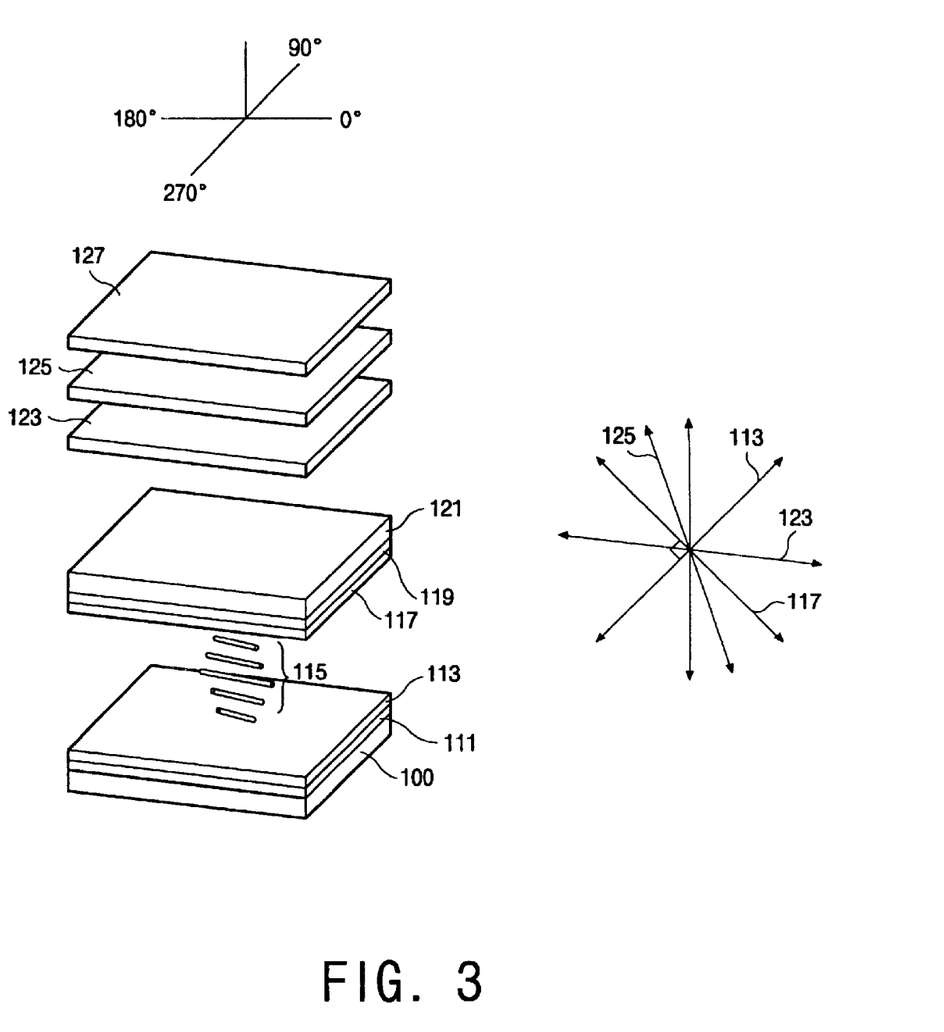
FIG. 3 is a perspective view illustrating the cell configuration of a reflective liquid crystal display device having two uniaxial films according to the invention.

Reference is now made to FIGS. 2 and 3 schematically showing the layer modeling for the simulation. Angular reference axes are shown above the various layers in FIG. 3. The liquid crystal display device has a lower substrate 100, a reflector 111, a lower orientation film 113, a nematic liquid crystal layer 115, an upper orientation film 117, a transparent electrode 119, an upper substrate 121, a lower retardation film 123, an upper retardation film 125 and a polarizer 127.

The following two embodiments of the invention use specific values for, e.g., indicates of refraction, thickness, etc. of, for example, the polarizer and upper glass substrate. However, the present invention is not constrained to the use of these exemplary parameters. Rather, the invention is intended to encompass any reflective cell structure having lower and upper retardation films as described above, the optical characteristics of which have been optimized according to the following methodology.

The polarizer 127 adopted for the simulation is one available from Nitto Denco Co. a Japanese company. The simulation conditions for the polarizer are that the refraction index is 1.5, the thickness is 180 $\mu$m and the angle of the transmission axis is 90 deg.

The retardation films 123 and 125 adopted for the simulation are uniaxial retardation films available from the above Japanese company. The lower and upper films 123 and 125 have birefringence properties of 140 nm and 270 nm, respectively. Both of the layers 123 and 125 are made of polycarbonate.

The refraction index and thickness of the upper glass substrate 121 adopted for the simulation are 1.5 and 0.7 mm, respectively, while any change in refraction index due to wavelength is ignored. The transparent electrode 119 is formed of ITO (indium tin oxide), and has a thickness of 500 Å and a refraction index of 1.92 at a wavelength of 550 nm.

The lower and upper orientation films have a thickness of 750 Å and a refraction index of 1.6, while any change in refraction index due to wavelength is ignored. The liquid crystal 115 is TN liquid crystal with left-handed dopant. The reflector 111 is made of aluminum and has a thickness of 2000 Å.

FIG. 3 also shows the orientation directions 113' and 117' of the respective lower and upper orientations films 113 and 117. Similarly, the respective optical axes 123' and 125' of the lower and upper uniaxial films 123 and 125 are also shown.

First, to find an optimum condition of the optical axis of the $\lambda/4$ plate composed of two uniaxial films 123 and 125, the conversion characteristic of a circularly polarized light when a linearly polarized light is incident is simulated and four combinations of optical axis are found as below.

In the first case, the optical axis angles of the lower and upper uniaxial films are 80 deg. and 17.5 deg., respectively. In the second case, the optical axis angles of the lower and upper uniaxial films are 10 deg. and 72.5 deg., respectively. In the third case, the optical axis angles of the lower and upper uniaxial films are 170 deg. and 107.5 deg., respectively. In the fourth case, the optical axis angles of the lower and upper uniaxial films are 162.5 deg. and 100 deg., respectively.

The first simulations of the above four combinations are performed to find the combinations suitable for an actual liquid crystal cell. The simulation program used in this invention is "LCD MASTER" available from Shin Tech. Co., a Japanese corporation.

The simulation conditions are fixed as follows: the transmission axis angle of the polarizer is 90 deg.; liquid crystal layer has a left-handed 90 deg. twist, and d$\Delta$n is 0.235 $\mu$m the birefringence ($\Delta$n=0.067, and the liquid crystal thickness d=0.35 $\mu$m). The simulation results are shown in the below table 1. In this first simulation, the optical axis angles of the lower and upper uniaxial films are fixed as above, and the orientation angle of the lower orientation is varied.

TABLE 1

| Condition | Reflectance | Contrast Ratio | White Color | Color Shift | Average |
|---|---|---|---|---|---|
| Case-1 between 200–220 deg | 3 | 2 | 3 | 3 | 2.75 |
| Case-2 between 200–220 deg | 1 | 2 | 2 | 1 | 1.5 |
| Case-3 between 200–220 deg | 2 | 1 | 2 | 1 | 1.5 |
| Case-4 between 240–260 deg | 4 | 3 | 1 | 2 | 2.5 |

In table 1, the characteristics are evaluated qualitatively, and similar qualitative results are ranked the same. A "1" is a high quality result, with "2", "3", etc., being of successively lower quality. According to the first simulation, cases 2 and 3 are chosen as "optimal" configurations.

A second simulation for the case-3 is performed to find optimal cell gap by varying the cell gap. The fixed condition for the second simulation is that the orientation angle of the lower orientation film 113 is 220°. As a result of the second simulation, a gap of 3.5 $\mu$m is chosen, since reflectance and the contrast ratio are at maximum around the gap of 3.5 $\mu$m. A range of cell gap of 3.5±10% $\mu$m will be allowed, since both reflectance and contrast ratio changes are below 3% in this range.

The two cell configurations regarded as optimal cell configurations (i.e., case-2 and case-3) are simulated in detail in the third simulation. In the third simulation, both the thickness of the liquid crystal layer and the orientation angle of the lower orientation film are fixed, and either the rms voltage applied or the viewing angle is varied. The first configuration condition for the third simulation is the case-3 when the gap=3.5 $\mu$m and the orientation angle of the lower orientation film=220 deg.

Figure 4:
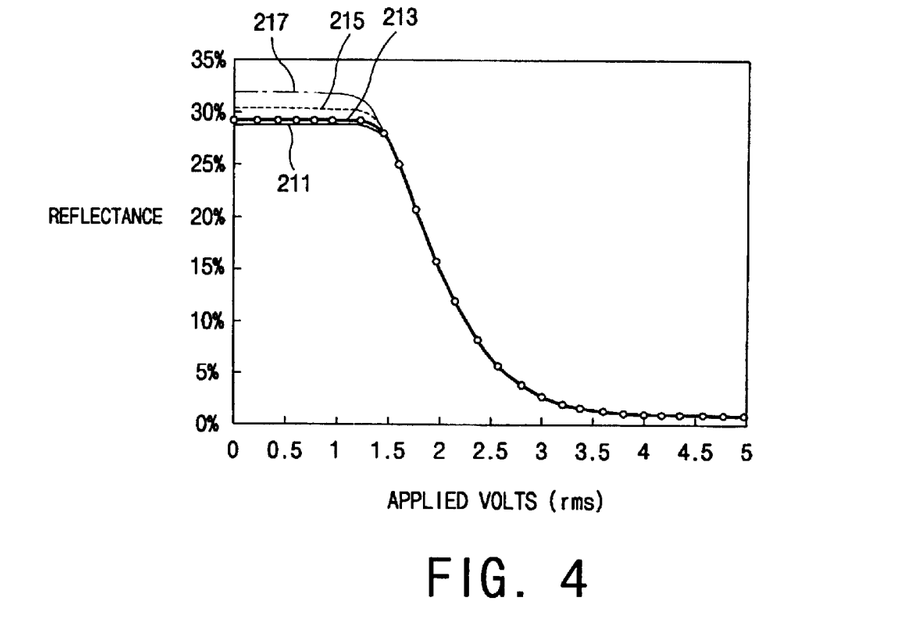
FIG. 4 is a simulation graph plotting a reflectance with respect to an applied voltage: according to the first embodiment of the invention.
Figure 5:
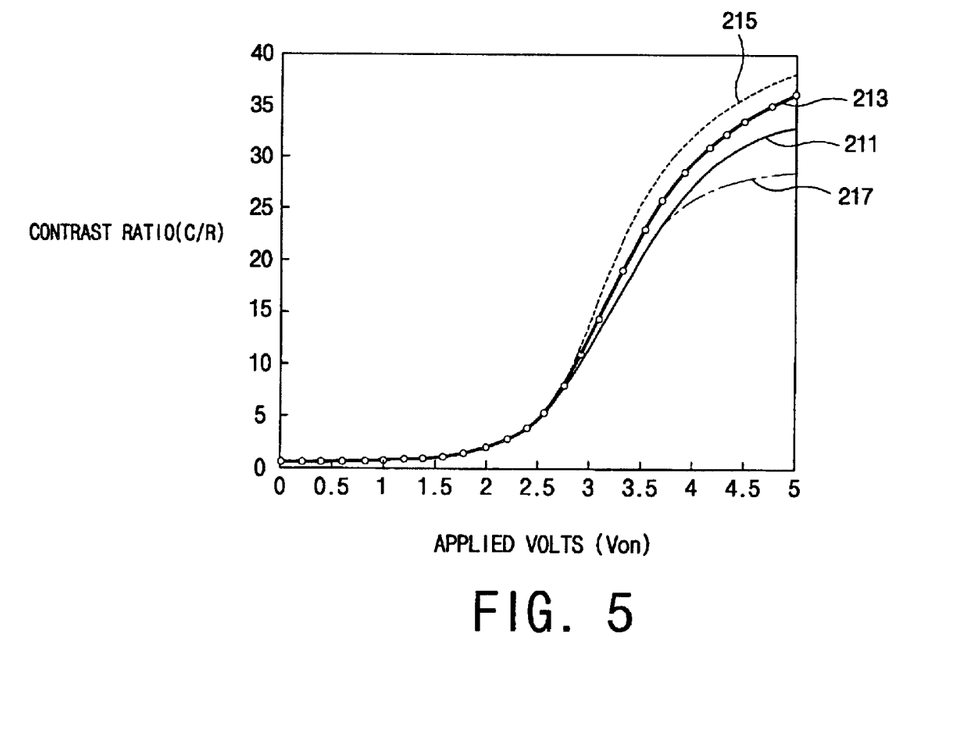
FIG. 5 is a simulation graph plotting a contrast ratio with respect to a voltage according to the first embodiment.

FIG. 4 is a simulation graph illustrating the relationship of the reflectance versus the applied voltage and FIG. 5 is a simulation graph illustrating the relationship of the contrast ratio versus the applied voltage.

In FIGS. 4 and 5, an observing azimuth angle is 270°. The simulations are performed by varying the tilt angle, or viewing angle, as 0° (211), 10° (213), 20° (215) and 30° (217). In the case of 10° (213), the reflectance for a white display is 29% and the contrast ratio for an applied rms voltage Von of 5V is 35%. The contrast ratio is high because an anti-reflection polarizer is used.

Figure 6:
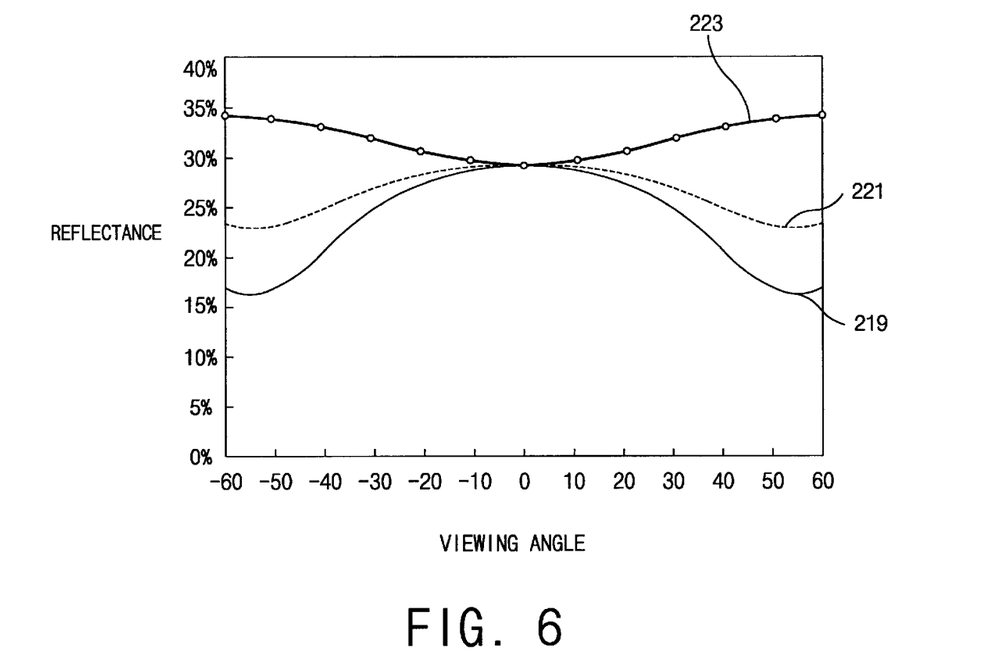
FIG. 6 is a simulation graph plotting a reflectance with respect to a viewing angle according to the first embodiment.
Figure 7:
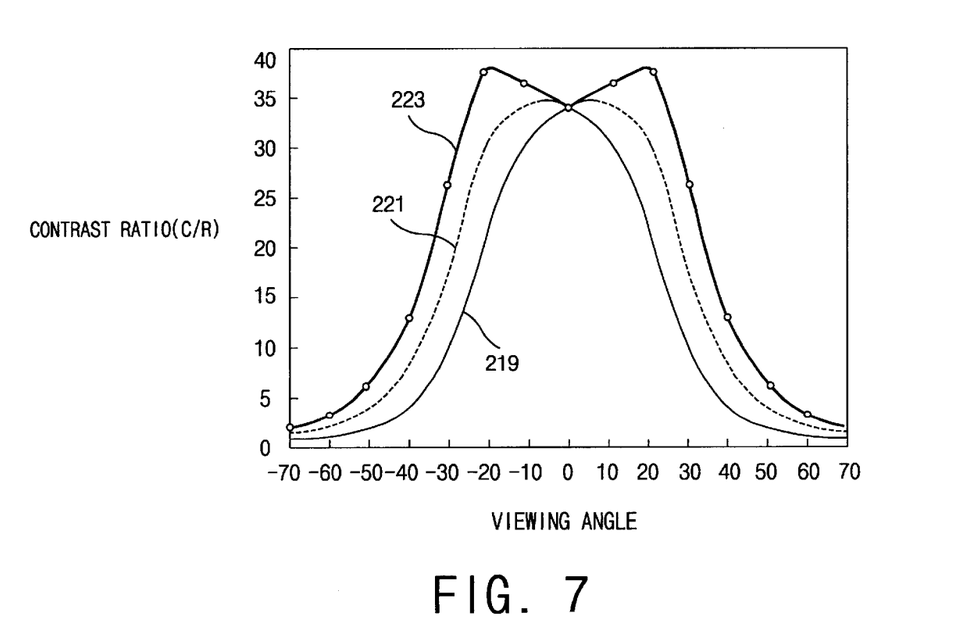
FIG. 7 is a simulation graph plotting a contrast ratio with respect to a viewing angle according to the first embodiment.

FIG. 6 is a simulation graph illustrating the relationship of the reflectance versus the viewing angle and FIG. 7 is a simulation graph illustrating the relationship of the contrast ratio versus the viewing angle. In FIGS. 6 and 7, an observing azimuth angle is 270°. The simulations are performed by varying the viewing angle as 0° (219), 45° (221) and 90° (223).

The optimized parameters have been described for a first configuration condition, but optimized parameters within the following limits are allowable, as determined from the simulation results: angle range of polarizer transmission axis of between 85° and 95°; upper uniaxial film: $\Delta n$ of between 260 and 280 nm and optical axis angle of between 97.5° and 117.5°; lower uniaxial film: $\Delta n$ of between 130 and 150 nm and optical axis angle of between 160° and 180°; orientation angle of the lower orientation film of between 200° and 240°; d$\Delta n$ of the liquid crystal layer: between 0.22 and 0.261 $\mu$m; and twist angle of the liquid crystal layer: between 85° and 95°.

Figure 8:
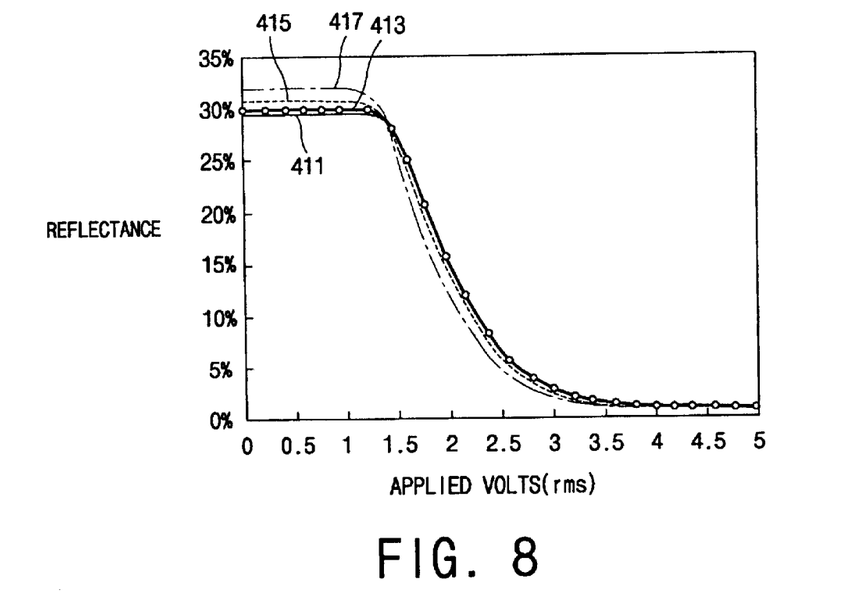
FIG. 8 is a simulation graph plotting a reflectance with respect to an applied voltage according to the second embodiment of the invention.
Figure 9:
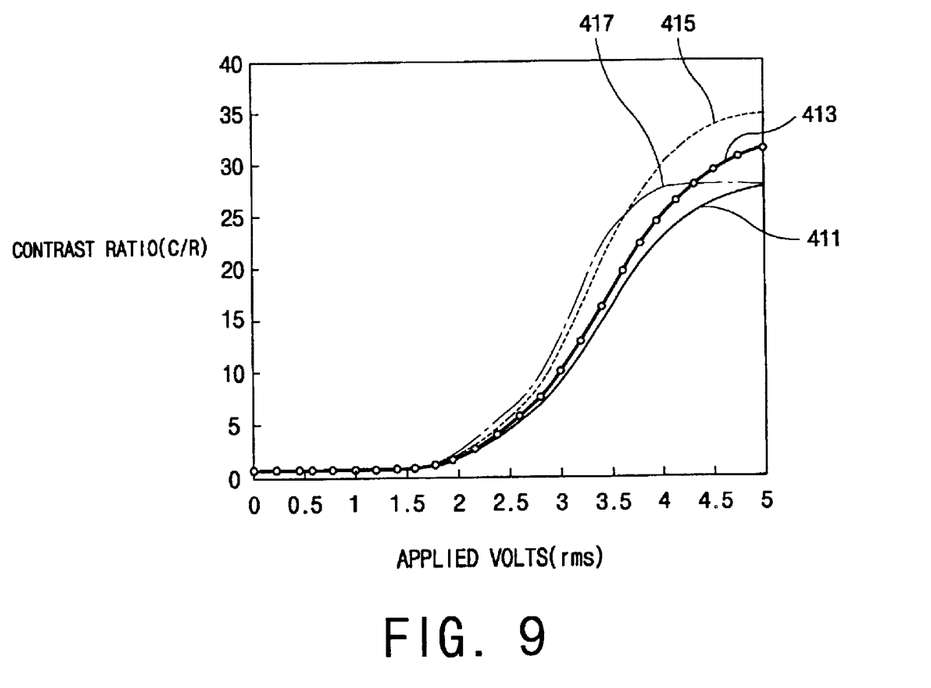
FIG. 9 is a simulation graph plotting a contrast ratio with respect to a voltage according to the second embodiment.

A second configuration condition is the case-2 when the gap=3.5 $\mu$m and the orientation angle=200 deg. FIG. 8 is a simulation graph plotting a reflectance versus applied voltages and FIG. 9 is a simulation graph plotting a contrast ratio with respect to applied voltages. In FIGS. 8 and 9, an observing azimuth angle is 270°. The simulations are performed by varying the tilt angle as 0° (411), 10° (413), 20° (415) and 30° (417).

In the case of 10° (413), the reflectance for a white display is 30% and the contrast ratio for an rms voltage of 5V is more than 30%. The contrast ratio is high because an anti-reflection polarizer is used.

Figure 10:
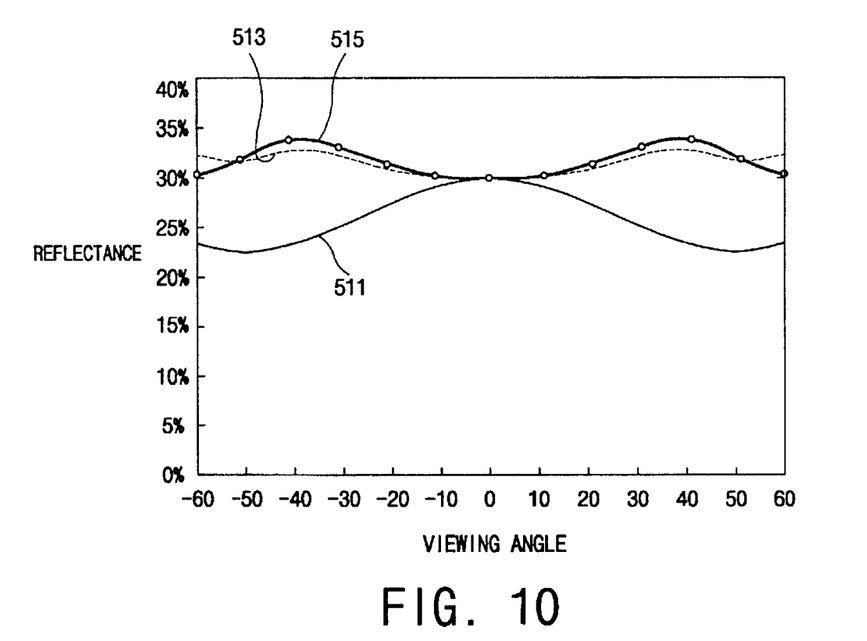
FIG. 10 is a simulation graph plotting a reflectance with respect to a viewing angle according to the second embodiment.
Figure 11:
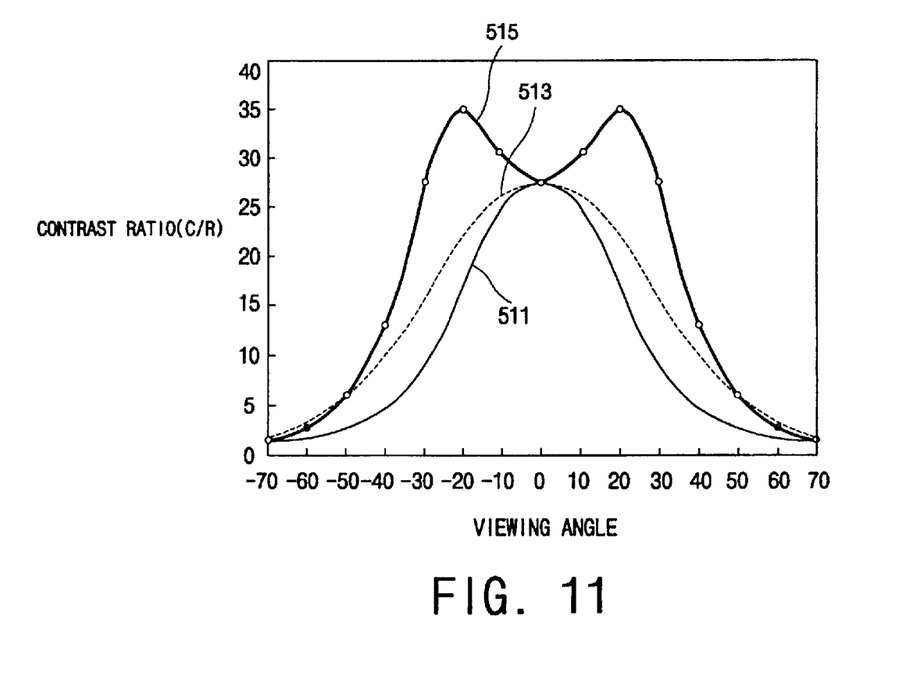
FIG. 11 is a simulation graph plotting a contrast ratio with respect to a viewing angle according to the second embodiment.

FIG. 10 is a simulation graph illustrating the relationship of the reflectance versus the viewing angle and FIG. 11 is a simulation graph illustrating the relationship of the contrast ratio versus the viewing angle for the second configuration. In FIGS. 9 and 10, an observing azimuth angle is 270°. The simulations are performed by varying the viewing angle as 0° (511), 45° (513) and 90° (515).

The optimized parameters have been described in the second configuration condition, but optimized parameters within the following limits are allowable, as determined from the simulation results: angle range of polarizer transmission axis of between 85° and 95°; upper uniaxial film: $\Delta n$ of between 260 and 280 nm and optical axis angle of between 62.5° and 82.5°; lower uniaxial film: $\Delta n$ of between 130 and 150 nm and optical axis angle of between 0° and 20°; orientation angle of the lower orientation film of between 180° and 220°; d$\Delta n$ of the liquid crystal layer: between 0.22 and 0.26 $\mu$m; and twist angle of the liquid crystal layer: between 85° and 95°.

As a result of the third simulation, the first configuration has better contrast ratio than the second, and the second configuration has a better reflectance than the first.

As described, the liquid crystal display device with a two layered $\lambda$/4 plate according to the invention has a high reflectance, a high contrast ratio, a wide viewing angle and a good color characteristic.

The described structure may be varied by the reflector having a bumpy surface and a diffuser on the upper substrate, which leads to similar results.

Although best modes and advantages of the invention has been described through several simulations, variations and changes thereof will be apparent to the skilled in the art. So, the above described preferred embodiments are by no means construed to restrict the present invention, the spirit and scope of which will be defined by the following claims.

What is claimed is:

1. A reflective liquid crystal display device, comprising:
    first and second substrates spaced apart and facing each other;
    a polarizer having a transmission axis angle in a range between 85° and 95° with respect to a positive x-axis;
    a twisted nematic liquid crystal layer between the two substrates, the liquid crystal layer having a twist angle range between 85° and 95° with respect to a positive x-axis, and a d$\Delta n$ range between 0.22 and 0.26 $\mu$m, where $\Delta n$ is a birefringence property and d is a thickness thereof;
    first and second orientation films on first and second sides of the liquid crystal layer, respectively, the second orientation film having an orientation angle in a range between 110° and 150° with respect to the transmission axis of the polarizer;
    a retardation film disposed on the first substrate and opposite to the liquid crystal layer, the film converting a first linearly polarized light to a first circularly polarized light and converting a second circularly polarized light to a second linearly polarized light; the film having first and second layers, the first layer having a d$\Delta n$ range between 260 and 280 nm and an optical axis angle in a range between 7.5° and 27.5° with respect to the transmission axis of the polarizer, the second layer having a d$\Delta n$ range between 130 and 150 nm and an optical axis angle in a range between 70° and 90° with respect to the transmission axis of the polarizer, said polarizer being disposed on said retardation film and converting the incident light to the first linearly polarized light; and
    a reflector disposed between the liquid crystal layer and the second substrate to reflect light passed through the liquid crystal layer.

2. The device of claim 1, wherein the thickness of the liquid crystal layer is about 3.5 $\mu$m.

3. The device of claim 1, wherein the reflector is made of aluminum.

4. The device of claim 1, wherein the reflector has a bumpy surface.

5. A reflective liquid crystal display device, comprising:
    first and second substrates spaced apart and facing each other;
    a polarizer having a transmission axis angle in a range between 85° and 95° with respect to a positive x-axis;
    a twisted nematic liquid crystal layer between the two substrates, the liquid crystal layer having a twist angle range between 85° and 95° with respect to a positive x-axis, and a d$\Delta n$ range between 0.22 and 0.26 $\mu$m, where $\Delta n$ is a birefringence property and d is a thickness thereof;
    first and second orientation films on first and second sides of the liquid crystal layer, respectively, the second orientation film having an orientation angle in a range between 90° and 110° with respect to the transmission axis of the polarizer;
    a retardation film disposed on the first substrate and opposite to the liquid crystal layer, the film converting a first linearly polarized light to a first circularly polarized light and converting a second circularly polarized light to a second linearly polarized light; the film having first and second layers, the first layer having a d$\Delta n$ range between 260 and 280 nm and an optical axis angle in a range between −27.5° and −7.5° with respect to the transmission axis of the polarizer, the second layer having dΔn range between 130 and 150 nm and an optical axis angle in a range between −90° and −70° with respect to the transmission axis of the polarizer, said polarizer being disposed on said retardation film and converting the incident light to the first linearly polarized light; and a reflector disposed between the liquid crystal layer and the second substrate and reflecting light passed through the liquid crystal layer.

6. The device of claim 5, wherein the thickness of the liquid crystal layer is about 3.5 μm.

7. The device of claim 5, wherein the reflector is made of aluminum.

8. The device of claim 5, wherein the reflector has a bumpy surface.

9. A reflective liquid crystal display device, comprising:
a reflector to reflect light impinging thereon;
a first orientation film on the reflector, the first orientation film having a first orientation angle with respect to a positive x-axis;
a twisted nematic liquid crystal layer on the first orientation film, having a twist angle range between 85° and 95° with respect to said first orientation angle of said first orientation film;
a second orientation film above the liquid crystal layer;
a first uniaxial film on the second orientation film, the first uniaxial film having a first optical axis angle with respect to a positive x-axis;
a second uniaxial film on the first uniaxial film, the second uniaxial film having a second optical axis angle with respect to a positive x-axis, and wherein the first and second uniaxial films together operate to change a polarization of incident light between circular and linear polarization; and
a polarizer on the second uniaxial film to pass light of a given linear polarization, wherein a transmission axis of said polarizer coincides with one of a first orientation direction of the first orientation film and a second orientation direction of the second orientation film.

10. The device of claim 9, wherein the liquid crystal layer has a dΔn from 0.22 to 0.26 μm, where Δn is a birefringence property and d is a thickness of the liquid crystal layer.

11. The device of claim 10, wherein the thickness of the liquid crystal layer is about 3.5 μm.

12. The device of claim 9, wherein the first optical axis angle ranges from 62.5° to 82.5°, and the second optical axis angle ranges from 0° and 20°.

13. The device of claim 12, wherein the first orientation angle ranges from 180° to 220°.

14. The device of claim 13, wherein the first uniaxial film has a birefringence: ranging from 260 to 280 nm, and the second uniaxial film has a birefringence ranging from 130 to 150 nm.

15. The device of claim 9, wherein the first optical axis angle ranges from 97.5° to 117.5°, and the second optical axis angle ranges from 160° and 180°.

16. The device of claim 15, wherein the first orientation angle ranges from 200° to 240°.

17. The device of claim 16, wherein the first uniaxial film has a birefringence ranging from 260 to 280 nm and the second uniaxial film has a birefringence ranging from 130 to 150 nm.

18. A reflective liquid crystal display device, comprising:
first and second substrates spaced apart and facing each other;
a polarizer having a predetermined transmission axis angle;
a twisted nematic liquid crystal layer between the two substrates, the liquid crystal layer having a twist angle range between 85° and 95° with respect to a positive x-axis, and a dΔn range between 0.22 and 0.26 μm, where Δn is a birefringence property and d is a thickness thereof;
first and second orientation films on first and second sides of the liquid crystal layer, respectively, the second orientation film having an orientation angle in a range between 110° and 150° with respect to the transmission axis of the polarizer;
a retardation film disposed on the first substrate and opposite to the liquid crystal layer, the film converting a first linearly polarized light to a first circularly polarized light and converting a second circularly polarized light to a second linearly polarized light; the film having first and second layers, the first layer having a dΔn range between 260 and 280 nm and an optical axis angle in a range between 7.5° and 27.5° with respect to the transmission axis of the polarizer, the second layer having a dΔn range between 130 and 150 nm and an optical axis angle in a range between 70° and 90° with respect to the transmission axis of the polarizer, said polarizer being disposed on said retardation film and converting the incident light to the first linearly polarized light; and
a reflector disposed between the liquid crystal layer and the second substrate to reflect light passed through the liquid crystal layer.

19. A reflective liquid crystal display device, comprising:
first and second substrates spaced apart and facing each other;
a polarizer having a predetermined transmission axis angle;
a twisted nematic liquid crystal layer between the two substrates, the liquid crystal layer having a twist angle range between 85° and 95° with respect to a positive x-axis, and a dΔn range between 0.22 and 0.26 μm, where Δn is a birefringence property and d is a thickness thereof;
first and second orientation films on first and second sides of the liquid crystal layer, respectively, the second orientation film having an orientation angle in a range between 90° and 110° with respect to the transmission axis of the polarizer;
a retardation film disposed on the first substrate and opposite to the liquid crystal layer, the film converting a first linearly polarized light to a first circularly polarized light and converting a second circularly polarized light to a second linearly polarized light; the film having first and second layers, the first layer having a dΔn range between 260 and 280 nm and an optical axis angle in a range between −27.5° and −7.5° with respect to the transmission axis of the polarizer, the second layer having dΔn range between 130 and 150 nm and an optical axis angle in a range between −90° and −70° with respect to the transmission axis of the polarizer, said polarizer being disposed on said retardation film and converting the incident light to the first linearly polarized light; and
a reflector disposed between the liquid crystal layer and the second substrate and reflecting light passed through the liquid crystal layer.

* * * * *